United States Patent
Lin

(10) Patent No.: US 11,550,359 B2
(45) Date of Patent: Jan. 10, 2023

(54) ELECTRONIC DEVICE

(71) Applicant: Lenovo (Beijing) Co., Ltd., Beijing (CN)

(72) Inventor: Jialin Lin, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/808,677

(22) Filed: Mar. 4, 2020

(65) Prior Publication Data
US 2020/0285276 A1    Sep. 10, 2020

(30) Foreign Application Priority Data
Mar. 4, 2019  (CN) .......................... 201910160473.0

(51) Int. Cl.
*G06F 1/16* (2006.01)

(52) U.S. Cl.
CPC .......... *G06F 1/1622* (2013.01); *G06F 1/1618* (2013.01); *G06F 1/1624* (2013.01); *G06F 2200/1614* (2013.01)

(58) Field of Classification Search
CPC .... G06F 1/1613; G06F 1/1615; G06F 1/1616; G06F 1/162; G06F 1/1622; G06F 1/1624
See application file for complete search history.

(56) References Cited

U.S. PATENT DOCUMENTS

| | | | | |
|---|---|---|---|---|
| 3,785,605 A * | 1/1974 | Parekh | ................. | A47B 23/044 248/455 |
| 5,085,394 A * | 2/1992 | Torii | ..................... | G06F 1/1681 248/455 |
| 5,629,833 A * | 5/1997 | Ido | ........................ | G06F 1/1616 361/679.01 |
| 6,430,038 B1 * | 8/2002 | Helot | .................... | G06F 1/1616 248/917 |
| 6,464,195 B1 * | 10/2002 | Hildebrandt | .......... | G06F 1/1616 248/460 |
| 6,504,707 B2 * | 1/2003 | Agata | ................... | G06F 1/1616 248/919 |
| 6,947,279 B2 * | 9/2005 | Cheng | ................... | G06F 1/1616 248/917 |
| 7,068,497 B2 * | 6/2006 | Chu | ..................... | F16M 11/046 248/919 |
| 7,082,028 B2 * | 7/2006 | Huilgol | ................. | G06F 1/1616 248/125.1 |

(Continued)

FOREIGN PATENT DOCUMENTS

| | | |
|---|---|---|
| CN | 2636370 Y | 8/2004 |
| CN | 101500383 A | 8/2009 |

(Continued)

*Primary Examiner* — Adrian S Wilson
(74) *Attorney, Agent, or Firm* — Anova Law Group, PLLC

(57) ABSTRACT

An electronic device includes a first body, a second body and a first connecting member. The first connecting member is movably connected to the first body and rotatably connected to the second body. The first connecting member is movably connected to the first body to change operation modes of the first body, and the first body is configured to rotate on a connecting surface connecting the first body to the first connecting member. The first connecting member is rotatably connected to the second body, and the first body is configured to flip relative to the second body to open or close the electronic device.

10 Claims, 12 Drawing Sheets

(56) References Cited

U.S. PATENT DOCUMENTS

| | | | |
|---|---|---|---|
| 7,206,196 B2* | 4/2007 | Ghosh | G06F 1/162 248/917 |
| 7,239,505 B2* | 7/2007 | Keely | G06F 1/1616 361/679.09 |
| 7,573,703 B2* | 8/2009 | Chuang | G06F 1/1626 361/679.21 |
| 7,652,873 B2* | 1/2010 | Lee | E05B 65/006 361/679.06 |
| 8,005,516 B2* | 8/2011 | Ohki | H04M 1/0247 455/575.1 |
| 8,023,256 B2* | 9/2011 | Walker | G06F 1/162 361/679.27 |
| 8,089,760 B2* | 1/2012 | Yi-Chang | G06F 1/1681 361/679.59 |
| 8,102,283 B2* | 1/2012 | Lin | H04M 1/0231 341/22 |
| 8,250,712 B2* | 8/2012 | Kim | H04M 1/0247 16/367 |
| 8,540,205 B2* | 9/2013 | Zhang | F16M 11/10 248/688 |
| 8,605,433 B2* | 12/2013 | Chiang | F16M 13/005 361/679.59 |
| 9,201,466 B2* | 12/2015 | Lai | G06F 1/1681 |
| 9,261,904 B2* | 2/2016 | Liu | G06F 1/1613 |
| 9,280,181 B2* | 3/2016 | Tomita | G06F 1/1677 |
| 9,372,507 B2* | 6/2016 | Dekock | G06F 1/1626 |
| 9,429,986 B2* | 8/2016 | Xia | G06F 1/1618 |
| 9,717,314 B2* | 8/2017 | Idehara | G06F 1/166 |
| 9,857,831 B2* | 1/2018 | Senatori | G06F 1/162 |
| 10,001,242 B2* | 6/2018 | van Hooft | F16M 11/38 |
| 2004/0114315 A1* | 6/2004 | Anlauff | G06F 1/1681 361/679.28 |
| 2004/0203527 A1* | 10/2004 | Matsumoto | H04N 7/142 455/90.3 |
| 2007/0158510 A1 | 7/2007 | Jung | |
| 2007/0217131 A1* | 9/2007 | Kehr | G06F 1/1649 361/679.27 |
| 2007/0217135 A1* | 9/2007 | Chuang | G06F 1/1681 361/679.05 |
| 2010/0232102 A1* | 9/2010 | Walker | G06F 1/1622 361/679.27 |
| 2011/0221319 A1* | 9/2011 | Law | G06F 1/1626 312/325 |
| 2012/0037285 A1* | 2/2012 | Diebel | G06F 1/1628 150/165 |
| 2012/0145876 A1* | 6/2012 | Zhou | G06F 1/1628 248/668 |
| 2012/0217174 A1* | 8/2012 | Ting | G06F 1/1628 206/45.2 |
| 2013/0134061 A1* | 5/2013 | Wu | G06F 3/0202 206/320 |
| 2013/0214661 A1* | 8/2013 | McBroom | G06F 1/162 312/325 |
| 2015/0092346 A1* | 4/2015 | Ben | G06F 1/166 361/679.55 |

FOREIGN PATENT DOCUMENTS

| | | |
|---|---|---|
| CN | 103294120 A | 9/2013 |
| CN | 104391543 A | 3/2015 |
| CN | 106610697 A | 5/2017 |

* cited by examiner

ELECTRONIC DEVICE

CROSS-REFERENCE TO RELATED APPLICATION

This application claims the priority to Chinese Patent Application No. 201910160473.0, entitled "An Electronic Device," filed on Mar. 4, 2019, the entire content of which is incorporated herein by reference.

TECHNICAL FIELD

The present disclosure relates to the technical field of electronic devices, and in particular relates to an electronic device having a rotatable screen.

BACKGROUND

In some electronic devices such as laptops, often, due to the restriction to the connection between the screen and the computer, the screen is in a single working form under operation. That is, the screen can only operate in landscape orientation relative to the computer, which cannot sufficiently satisfy more diverse usage needs of the users.

SUMMARY

According to one aspect of the present disclosure, an electronic device is provided. The electronic device includes a first body, a second body and a first connecting member. The first connecting member is movably connected to the first body to change operation modes of the first body, and the first body is configured to rotate on a connecting surface connecting the first body to the first connecting member. The first connecting member is rotatably connected to the second body, and the first body is configured to flip relative to the second body to open or close the electronic device.

The above aspects will be described in detail with accompanying drawings.

BRIEF DESCRIPTION OF THE DRAWINGS

In order to explain the technical solutions in the embodiments of the present disclosure or the prior art more clearly, the drawings used in the description of the embodiments or the prior art are briefly introduced below. Apparently, the drawings in the following description are merely embodiments of the present disclosure. For those of ordinary skill in the art, other drawings can be obtained according to the provided drawings without making creative efforts.

REFERENCE NUMERALS

Figure 1:
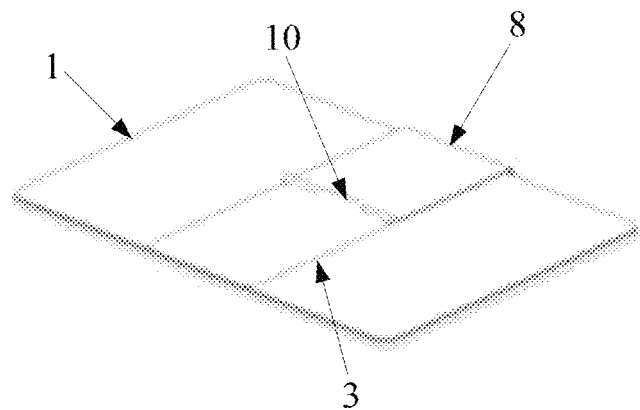
FIG. 1 is a schematic structural diagram of an electronic device according to some embodiments of the present disclosure.
Figure 2:
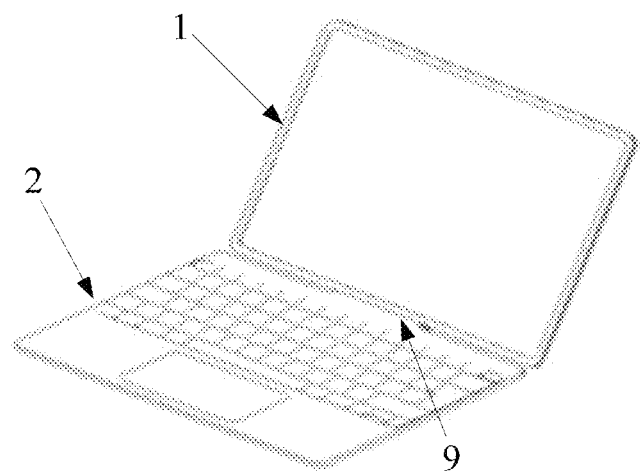
FIG. 2 is a schematic structural diagram of an electronic device when a screen is in a landscape mode after the electronic device is extended according to some embodiments of the present disclosure.
Figure 3:
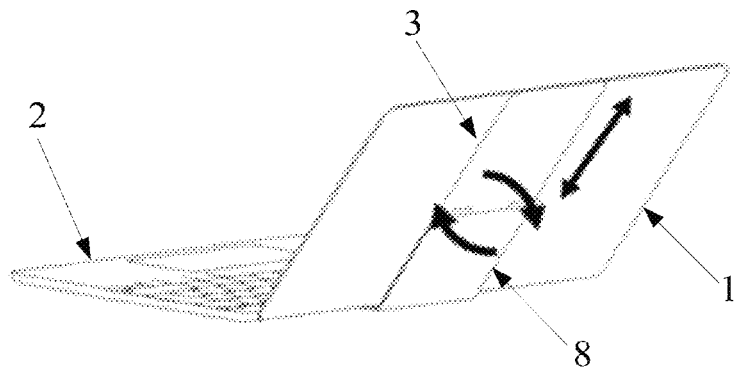
FIG. 3 is a rear view of the electronic device in FIG. 2.
Figure 4:
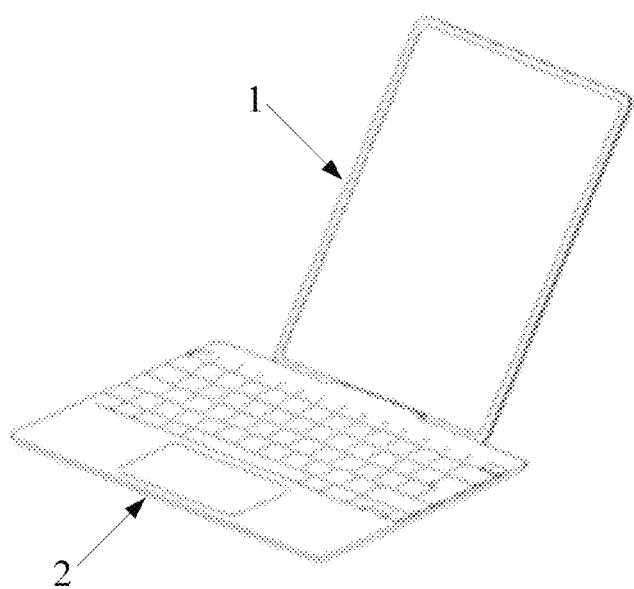
FIG. 4 is a schematic structural diagram when the screen in a portrait mode according to some embodiments of the present disclosure.
Figure 5:
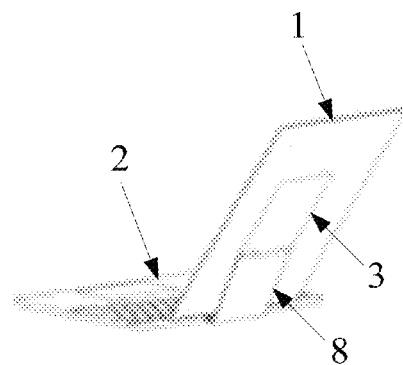
FIG. 5 is a rear view of the electronic device in FIG. 4.

1—first body, 2—second body, 3—first connecting member, 4—first pin, 5—first tracking slot, 6—second pin, 7—second tracking slot, 8—second connecting member, 9—second rotation mechanism, 10—third rotation mechanism, 11—motion baseline.

DETAILED DESCRIPTION OF THE EMBODIMENTS

The present disclosure provides an electronic device that can work in more modes to satisfy more diverse usage needs of the users.

Below the technical solutions in the embodiments of the present disclosure will be clearly and completely described with reference to the drawings in the embodiments of the present disclosure. Obviously, the described embodiments are only a part of the embodiments of the present disclosure, but not all of the embodiments. Based on the embodiments in the present disclosure, all other embodiments obtained by a person of ordinary skill in the art without creative efforts shall fall within the scope of the present disclosure.

In some embodiments, as shown in FIG. 1 to FIG. 24, the electronic device provided in the present disclosure mainly includes a first body 1, a second body 2, and a first connecting member 3. In some embodiments, one end of the first connecting member 3 is rotatably connected to the second body 2 so that the first connecting member 3 and the first body 1 connected to the first connecting member 3 can flip relative to the second body 2, and the electronic device can be opened and closed through the flipping operation. The other end of the first connecting member 3 is movably connected to the first body 1, and this movable connection can at least cause the first body 1 to rotate on the first connecting member 3. Specifically, the first body 1 disposed on the connecting member 3 can rotate on the connecting surface, which refers to the plane where the first body 1 and the first connecting member 3 are connected; that is, the first body 1 can rotate on a plane where a surface of the first connecting member 3 is located.

In the electronic device of the above structure, the first body 1 can rotate relative to the second body 2 driven by the first connecting member 3. And when the first connecting member 3 does not rotate relative to the second body 2, the first body 1 can rotate on the connecting surface. Accordingly, the first main body 1 can not only rotate in a three-dimensional space but also in a plane relative to the second body 2, so that when the first body 1 does not rotate relative to the second body 2, it can make a planar rotation to change its position and angle relative to the second body 2. Accordingly, the electronic device may have more operation modes, which satisfies more diverse usage needs of the users.

In some embodiments of the present disclosure, as shown in FIG. 1 to FIG. 24, the electronic device may be a notebook computer. In some embodiments, the first body 1 may be a screen, the second body 2 may be a computer, and the connecting surface may be parallel to a display surface of the first body 1. When the electronic device is the notebook computer, the above structure can cause the screen of the notebook computer to not only flip relative to the computer, but also make planar rotation relative to the computer. For example, as shown in FIGS. 2 to 5, a rectangular screen may change from a landscape mode to a portrait mode by a planar rotation, so that the operation mode of the notebook computer can be more diverse. In addition, the electronic device may be other devices, such as a flip phone.

In some embodiments of the present disclosure, the first body 1 and the second body 2 may be both rectangular plate-shaped members (that is, the shape required for the screen and the computer of the notebook computer), and the first body 1 has a motion baseline 11 parallel to a top surface of the second body 2. The motion baseline 11 is located between the first body 1 and the second body 2. The first body 1 can rotate and slide on the first connecting member 3, and during the rotation and sliding process, as shown in FIGS. 6-14, the first body 1 remains at one side of the motion baseline 11. Since the first body 1 and the second body 2 are rotationally connected and coupled for operation, in order to avoid interference between the first body 1 during the planar rotation and the second body 2, the present disclosure delineates a virtual motion baseline 11 to the first body 1 and restrict any part (especially corners) of the first body 1 from crossing the active baseline 11 during the planar rotation. Because the motion baseline 11 is set to avoid the interference between the first body 1 and the second body 2, the delineated motion baseline 11 is located between the first body 1 and the second body 2, and is parallel to the top surface of the second body 2. In some embodiments, in order to simplify the manufacturing process, the motion baseline 11 may be a straight line on the top surface of the second body 2; that is, no part of the first body 1 during the planar rotation is in contact with the top surface of the second body 2. As shown by the arrow in FIG. 2, in order to ensure that no part of the rectangular first body 1 cross the active baseline 11, it is necessary that the first body 1 is sliding on the first connecting member 3 while it is rotating on the first connecting member 3 (that is, the aforementioned moving connection refers to both a rotation connection and a sliding connection). Accordingly, during the rotation of the first body 1, when corners of the first body 1 gradually approach the motion baseline 11, the first body 1 can slide in a direction away from the motion baseline 11 to prevent any corner of the first body 1 from crossing the motion baseline 11. When the corners gradually move away from the motion baseline 11, the first body 1 can slide in a direction toward the motion baseline 11 to avoid an excessive gap between the first body 1 and the second body 2, which ensures the aesthetics of the electronic device in different operation modes.

The first body 1 and the first connecting member 3 are connected by a first rotation mechanism. This first rotation mechanism is rotatably connected to the first body 1, a first pin 4 is disposed on the first rotation mechanism, and a first tracking slot 5 is disposed on the first connecting member 3. As shown in FIGS. 6-9, the first pin 4 extends into the first tracking slot 5 and can slide in the first tracking slot 5, to realize the sliding connection between the first rotation mechanism and the first connecting member 3. Specifically, the structure of the first rotating mechanism may have various options. For example, the first rotation mechanism includes a shaft and a shaft sleeve rotatably sleeved on the shaft. The first body 1 is connected to the shaft sleeve so that the first body 1 is rotatably connected to the shaft by the shaft sleeve. At the same time, in order to simplify the structure, the shaft may be the first pin 4, one end of the first pin is sleeved with the shaft sleeve, and the other end extends into the first tracking slot 5 and slides in the first tracking slot 5, to realize the rotation and sliding of the first body 1 relative to the first connecting member 3. A torque of the first body 1 remaining in the rotating position after the rotation is provided by a friction between the shaft sleeve and the shaft; or, the first rotation mechanism may also be a bearing-like structure. That is, the first body 1 is connected to an inner ring member of the structure, and the first pin 4 is connected to an outer ring member of the structure, to realize a rotation of the first body 1 on the first connecting member 3 by a relative rotation between the inner ring member and the outer ring member, and realize a sliding of the first body 1 on the first connecting member 3 by sliding of the outer ring member and the first pin 4 in the first tracking slot 5.

In order to further improve sliding stability of the first body 1 on the first connecting member 3, in some embodiments of the present disclosure, on the basis of disposing the first pin 4 and the first tracking slot 5, a second tracking slot 7 is disposed on the first connecting member 3, a second pin 6 is disposed on the first rotation mechanism, and as shown in FIGS. 6-9, the second pin 6 extends into the second tracking slot 7 and can slide in the second tracking slot 7. That is, the relative sliding of the first body 1 and the first connecting member 3 is realized by two sets of mechanisms, and the mutual cooperation of the two sets of mechanisms can further improve sliding accuracy and stability of the first body 1 which makes the planar rotation of the first body 1 better.

Figure 11:
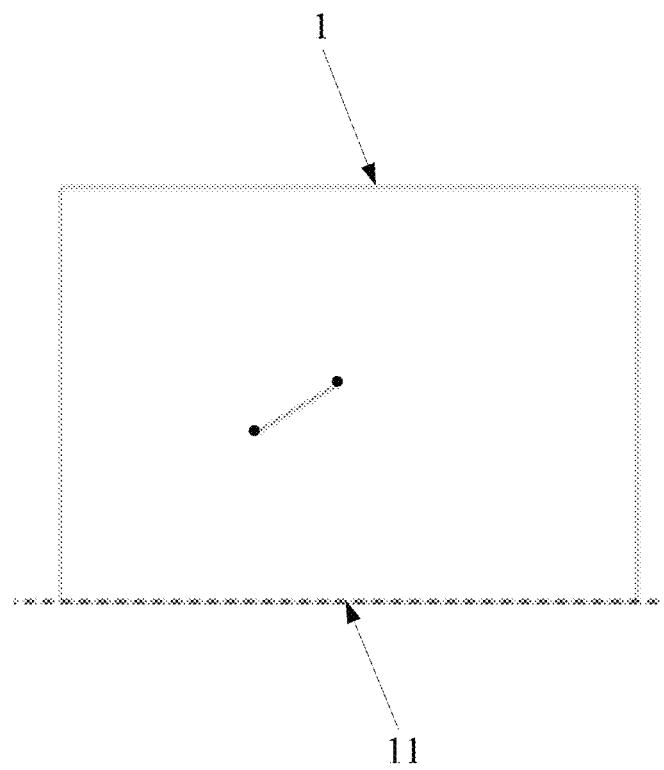
FIG. 11 is a schematic diagram of two points selected on the first body according to some embodiments of the present disclosure.
Figure 12:
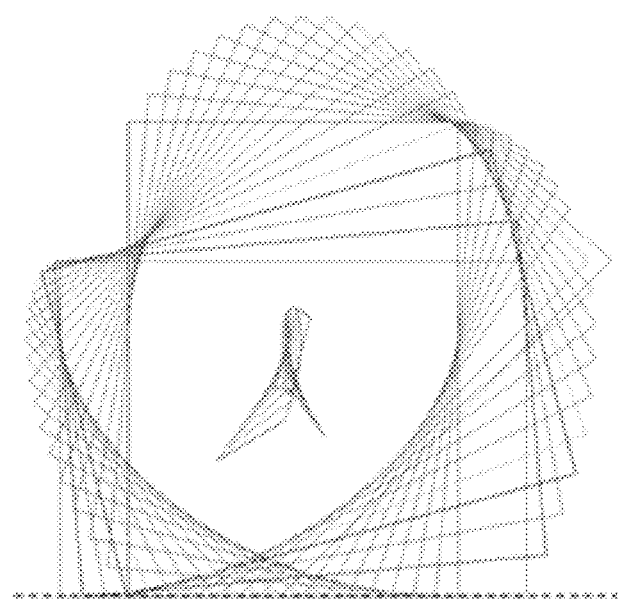
FIG. 12 is a trajectory diagram of a segment connecting the two points during a counterclockwise rotation of the first body according to some embodiments of the present disclosure.
Figure 13:
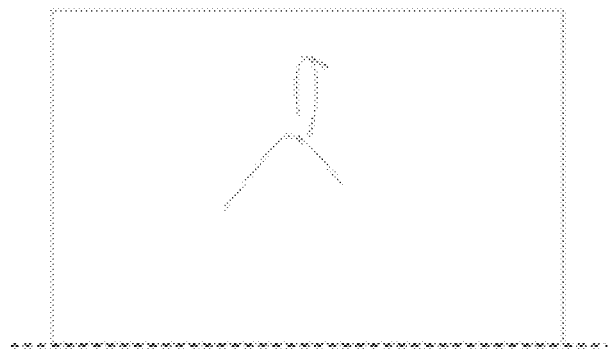
FIG. 13 is a trajectory diagram of the two points according to some embodiments of the present disclosure.
Figure 14:
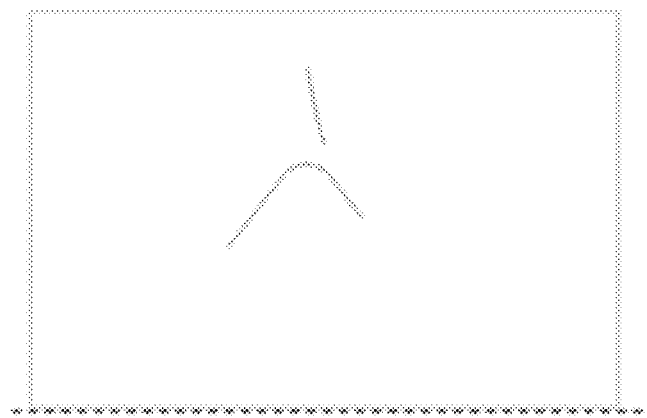
FIG. 14 is a simplified schematic diagram of the trajectory of the two points according to some embodiments of the present disclosure.
Figure 15:
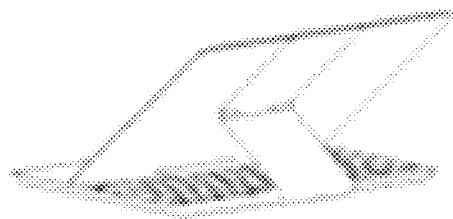
FIGS. 15 to 24 are schematic structural diagrams of the electronic device in different modes through the coupling of the first connecting member and the second connecting member, respectively, according to some embodiments of the present disclosure.
Figure 16:
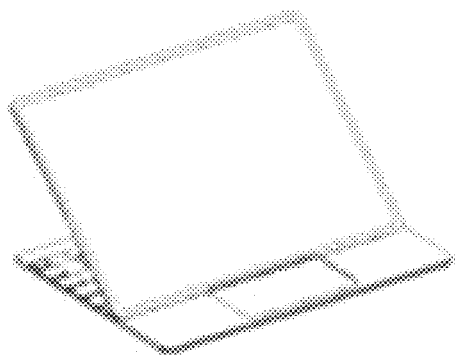
Figure 17:
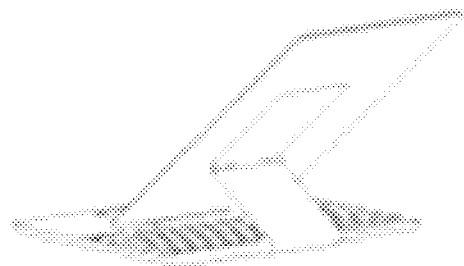
Figure 18:
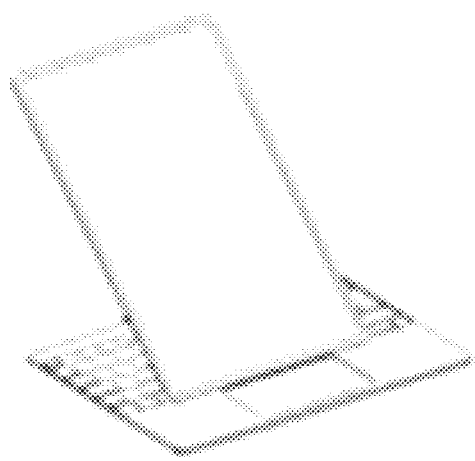
Figure 19:
Figure 20:
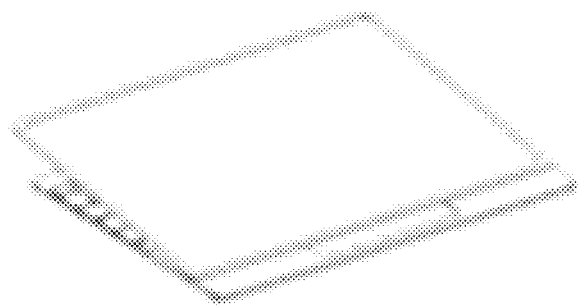
Figure 21:
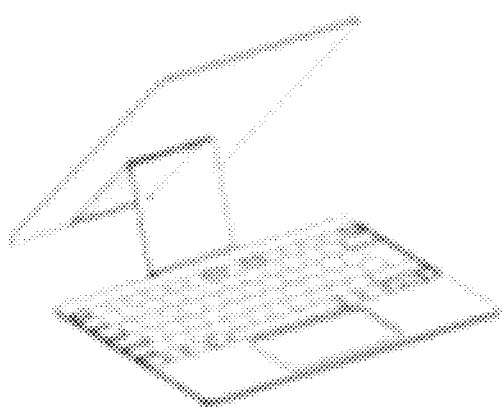
Figure 22:
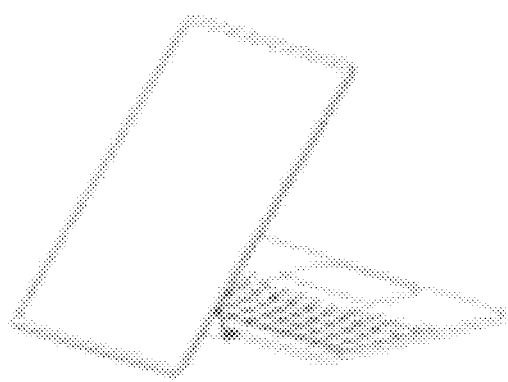
Figure 23:
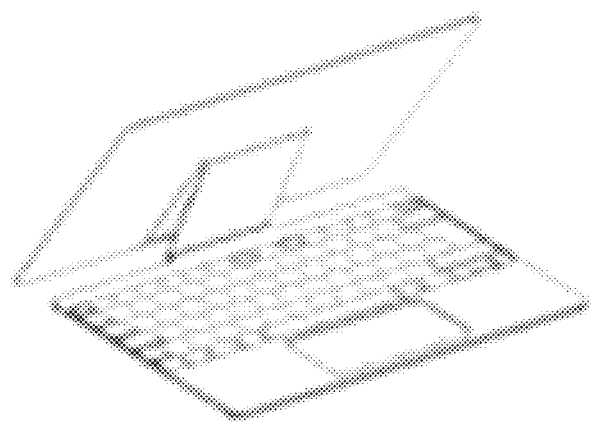
Figure 24:
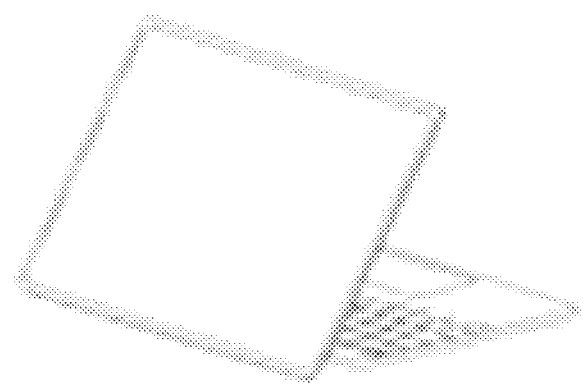

Specifically, determination of the first tracking slot 5 and the second tracking slot 7 on the first connecting member 3 is implemented by the following methods:

First, the planar rotation of the first body 1 may be determined. That is, as shown in FIGS. 6-10, a landscape mode may be changed to a portrait mode. And then, as shown in FIG. 11, two points may be determined on the first body 1. These two points correspond to shaft ends of the first pin 4 and the second pin 6, respectively. Then, as shown in FIG. 12, the first body 1 may rotate 90 degrees counterclockwise. As shown in FIG. 12, during the rotation, a trajectory of a segment connecting the above-mentioned two points are recorded, and accordingly, a moving trajectory line can be obtained, as shown in FIG. 13. Then, as shown in FIG. 14, the trajectory line is simplified to obtain a simplified trajectory line. Finally, a groove is disposed in the first connecting member 3 along the trajectory line to obtain the first tracking slot 5 and the second tracking slot 7, as shown in FIGS. 6-9.

Figure 6:
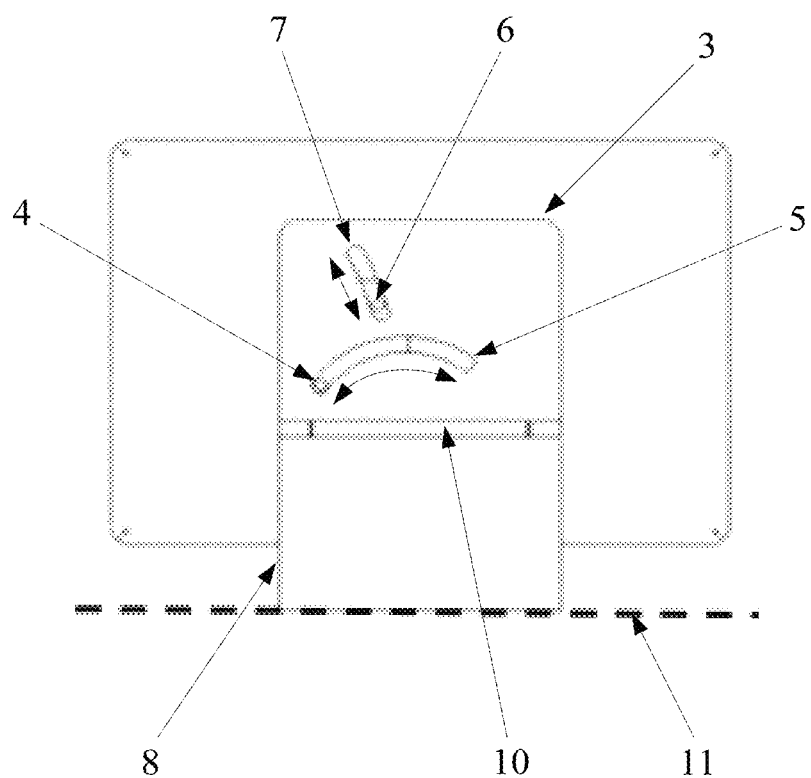
FIGS. 6 to 9 are schematic structural diagrams of a first body at different angles in a process when the first body rotates 90 degrees counterclockwise according to some embodiments of the present disclosure.
Figure 7:
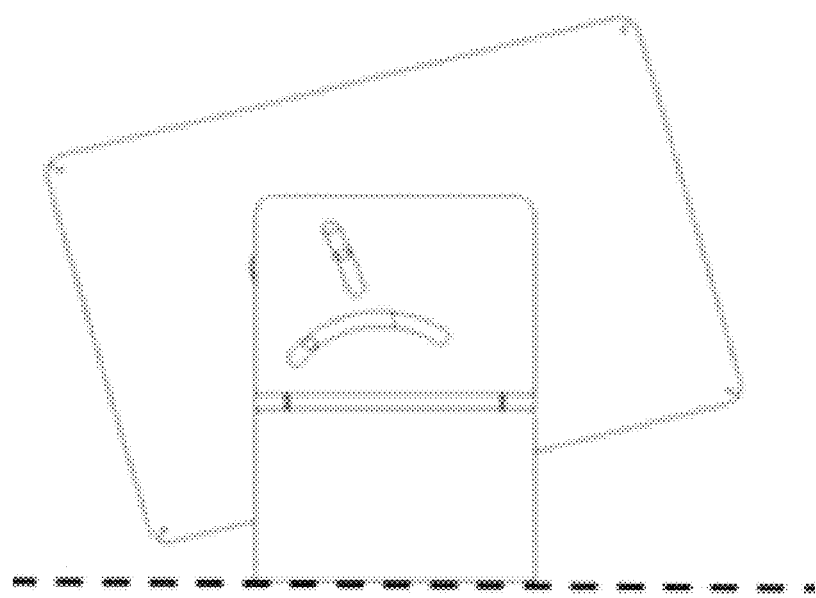
Figure 8:
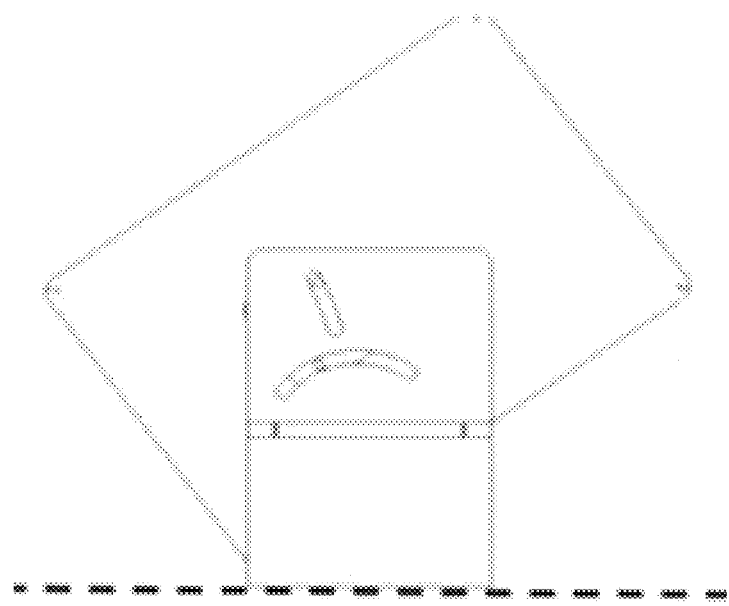
Figure 9:
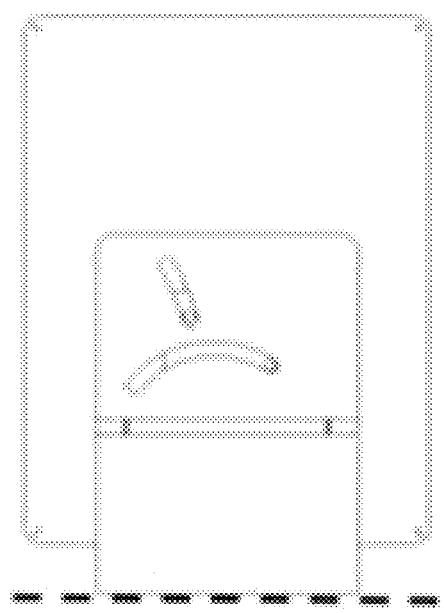
Figure 10:
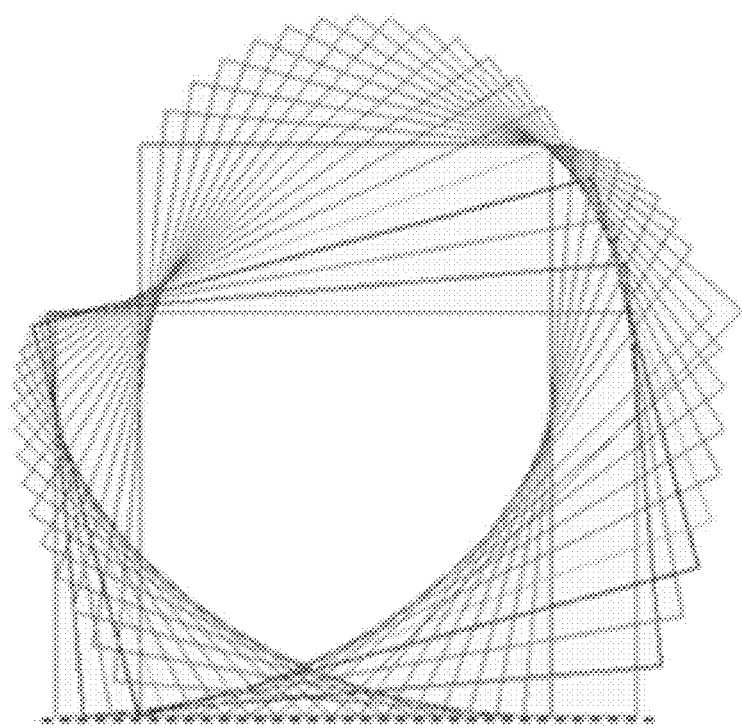
FIG. 10 is a trajectory diagram of the first body rotating 90 degrees counterclockwise according to some embodiments of the present disclosure.

Accordingly, based on the above-mentioned trajectory, during the process when the first body 1 rotates 90 degrees counterclockwise, the corners of the first body 1 gradually approach the motion baseline 11 due to the rotation, as shown in the states in FIGS. 7 and 8. In order to prevent any corner from crossing the motion baseline 11 at a bottom, the first body 1 needs to move up at the same time, so the first pin 4 and the second pin 6 connected to the first body 1 may also move up accordingly, in the first tracking slot 5 and the second tracking slot 7, respectively, as shown in FIGS. 7 and 8. When a corner passes a lowest position and starts to rise; that is, the corner gradually moves away from the motion baseline 11 at the bottom, as shown in the process from FIG. 8 to FIG. 9, the first body 1 needs to move down, so the first pin 4 and the second pin 6 connected to the first body 1 may also move down accordingly, in the first tracking slot 5 and the second tracking slot 7, respectively, as shown in FIGS. 8 and 9. In the above process, the first pin 4 slides from one side of the first tracking slot 5 to the other side, as shown in FIGS. 6 and 9, and the second pin 6 slides back and forth in the second tracking slot 7 then returns to its original position, as shown in FIG. 6 and FIG. 9.

Further, as shown in FIG. 1 to FIG. 9 and FIG. 15 to FIG. 24, in some embodiments of the present disclosure, the first connecting member 3 is rotatably connected to the second body 2 through the second connecting member 8, the second connecting member 8 is rotatably connected to the second body, and the second connecting member 8 is rotatably connected to the first connecting member 3, so that the second connecting member 8 can flip relative to the second body 2 and the first connecting member 3 can flip relative to the second connecting member 8. In the foregoing structure, since the connecting surface is a surface parallel to the display surface of the screen, the screen of the notebook computer can change from a landscape mode to a portrait mode by rotating on the connecting surface. After the second connecting member 8 is added, since the connection method of the second connecting member 8 and the second body 2 is the same as that of the second connecting member 8 and the first connecting member 3, the rotation of the first body relative to the second body can be implemented not only by the flip of the second connecting member 8 relative to the second body 2 but also by the flip of the first connecting member 3 relative to the second connecting member 8, which makes the electronic device to have more operation modes, as shown in FIG. 15 to FIG. 24, so that the operation performance of the electronic device can be significantly optimized.

In some embodiments, the second rotation mechanism 9 connecting the second connecting member 8 and the second body 2 and the third rotation mechanism 10 connecting the second connecting member 8 and the first connecting member 3 are both 360-degree rotation shaft mechanisms, so that the second connecting member 8 can flip 360 degrees relative to the second body 2 and the first connecting member 3 can flip 360 degrees relative to the second connecting member 8, which makes the electronic device to operate at more angles under more modes, as shown in FIGS. 15-24. Specifically, the 360-degree rotation shaft mechanism may be an existing 360-degree rotation shaft mechanism.

In some embodiments, as shown in FIG. 1 to FIG. 9 and FIG. 15 to FIG. 24, the first connecting member 3 is a plate-shaped member that can attach to the first body 1, and a surface of the plate-shaped member having a maximum area may be the aforementioned connecting surface. At the same time, in some embodiments, the second connecting member 8 may also be a plate-shaped member that can attach to the first body 1. In some embodiments, since the electronic device is a notebook computer, and a current development trend of the notebook computer is thinner and lighter, in order to better match the shape of the notebook computer and reduce excessive impact of disposing the first connecting member 3 and the second connecting member 8 on the shape of the notebook computer, both the first connecting member 3 and the second connecting member 8 may be plate-shaped members. In addition, the plate-shaped member can also make the contact area of the connecting surface on the first connecting member 3 larger, which can not only improve the stability of the planar rotation of the screen, but also provides sufficient area to dispose the first tracking slot 5 and the second tracking slot 7.

In this specification, the structure of each part is described in a progressive manner. The structure of each part focuses on the distinctions from the existing structure. The overall and partial structure of the electronic device can be obtained by combining the structures of the multiple parts mentioned above.

The above description of the disclosed embodiments enables those skilled in the art to implement or use the present disclosure. Various modifications to these embodiments will be apparent to those skilled in the art, and the general principles defined herein may be implemented in other embodiments without departing from the spirit or scope of the disclosure. Therefore, the disclosure will not be limited to the embodiments shown herein, but should conform to the broadest scope commensurate with the principles and novel features disclosed herein.

What is claimed is:

1. An electronic device, comprising:
a first body having a first side and a second side;
a second body having a third side and a fourth side;
a first connecting member movably connected to the first body and rotatably connected to the second body to cause a planar rotation of the first body relative to the second body to change from a landscape mode to a portrait mode, the first connecting member being a plate-shaped member attached to the first body; and
a second connecting member rotatably connected to the first connecting member and the second body, the second connecting member being a plate-shaped member, the second connecting member being rotatably connected to the first body through the first connecting member, and the first connecting member being rotatably connected to the second body through the second connecting member, wherein:
the first body is configured to flip relative to the second body to open or close the electronic device;
at a beginning of a rotation, the first side of the first body overlaps with the third side of the second body in one of the landscape mode or the portrait mode, and the first body is located within a rotation plane;
at an end of the rotation, the second side of the first body overlaps with the third side of the second body in the other mode of the landscape mode or the portrait mode, and during the rotation of the first body with respect to the second body, the first body remains in the rotation plane;
the first connecting member comprises a first pin, a first tracking slot, a second pin, and a second tracking slot, the first pin and the first tracking slot forming an arc track, the second pin and the second tracking slot forming a straight track and being located above the first pin and the first tracking slot, the first pin extending into the first tracking slot to slide in the first tracking slot and the second pin extending into the second tracking slot to slide in the second tracking slot such that the first body slides stably on the first connecting member; and during both the planar rotation of the first body relative to the second body and a flipping process of the first body relative to the second body, the first connecting member is parallel to the first body.

2. The electronic device according to claim 1, wherein: the first body and the second body are both rectangular plate-shaped members; and the first body has a motion baseline parallel to a top surface of the second body, the motion baseline is located between the first body and the second body; the first body rotates and slides on the first connecting member, and during the rotation and slide, the first body remains on one side of the motion baseline.

3. The electronic device according to claim 2, further comprising:

a first rotation mechanism rotatably connected to the first body, wherein the first pin is disposed at the first rotation mechanism; the first tracking slot is disposed in the first connecting member, and the first pin extends into the first tracking slot and slides in the first tracking slot to implement a sliding connection between the first rotation mechanism and the first connecting member.

4. The electronic device according to claim 2, wherein during the rotation, the first body slides in a direction away from the motion baseline when corners of the first body gradually approach the motion baseline and slides in a direction toward the motion baseline when the corners gradually move away from the motion baseline.

5. The electronic device according to claim 3, wherein the second pin is disposed at the first rotation mechanism.

6. The electronic device according to claim 5, wherein when the first body changes from the landscape mode to the portrait mode in the planar rotation relative to the second body, a segment connecting two points on the first body corresponding to shaft ends of the first pin and the second pin, respectively, moves in a trajectory line configured to be a trajectory line to dispose the first tracking slot and the second tracking slot.

7. The electronic device according to claim 1, further comprising:

a second rotation mechanism connecting the second connecting member and the second body; and a third rotation mechanism connecting the second connecting member and the first connecting member;

wherein both the second rotation mechanism and the third rotation mechanism are 360-degree rotation shaft mechanisms.

8. The electronic device according to claim 1, wherein the electronic device is a notebook computer, the first body is a display screen, and the second body is a computer body including a keyboard.

9. The electronic device according to claim 8, wherein the display screen is rectangular and a screen orientation changes from the landscape mode to the portrait mode in the planar rotation relative to the computer body.

10. The electronic device according to claim 1, wherein the straight track is parallel to the rotation plane within which the first body rotate, and the straight track is inclined relative to both the first side and the second side of the first body.

* * * * *